(12) United States Patent
Zhang et al.

(10) Patent No.: US 12,420,504 B2
(45) Date of Patent: Sep. 23, 2025

(54) POLARIZER AND MANUFACTURING METHOD THEREOF, DISPLAY PANEL AND MANUFACTURING METHOD THEREOF

(71) Applicant: BOE TECHNOLOGY GROUP CO., LTD., Beijing (CN)

(72) Inventors: Xiongnan Zhang, Beijing (CN); Paoming Tsai, Beijing (CN); Haoran Wang, Beijing (CN); Xuekai Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1051 days.

(21) Appl. No.: 17/293,687

(22) PCT Filed: Jul. 28, 2020

(86) PCT No.: PCT/CN2020/105249
§ 371 (c)(1),
(2) Date: May 13, 2021

(87) PCT Pub. No.: WO2022/021076
PCT Pub. Date: Feb. 3, 2022

(65) Prior Publication Data
US 2022/0305748 A1 Sep. 29, 2022

(51) Int. Cl.
*B29D 11/00* (2006.01)
*G02B 5/30* (2006.01)

(52) U.S. Cl.
CPC .......... *B29D 11/00644* (2013.01); *B29D 11/00384* (2013.01); *B29D 11/0073* (2013.01); *G02B 5/305* (2013.01); *G02B 5/3083* (2013.01)

(58) Field of Classification Search
CPC ........ B29D 11/00644; B29D 11/00384; B29D 11/0073; G02B 5/305; G02B 5/3083
See application file for complete search history.

(56) References Cited

U.S. PATENT DOCUMENTS

| 7,695,653 B2 | 4/2010 | Hsu |
| 7,776,239 B2 | 8/2010 | Hsu |

(Continued)

FOREIGN PATENT DOCUMENTS

| CA | 2714074 A1 | 4/2009 |
| CA | 2714074 C | 12/2014 |

(Continued)

OTHER PUBLICATIONS

Written Opinion for International Application No. PCT/CN2020/105249 mailed Apr. 29, 2021.

*Primary Examiner* — Mathieu D Vargot
(74) *Attorney, Agent, or Firm* — Perilla Knox & Hildebrandt LLP; Kenneth A. Knox

(57) ABSTRACT

The present disclosure relates to the field of display technology, and provides a polarizer, a display panel, and a manufacturing method for the two. The method for manufacturing a polarizer comprises: providing a flat, semi-finished polarizing product comprising a linear polarizing sheet and a phase difference layer stacked over each other; providing an abutment comprising a supporting plane, wherein at least a portion of an edge of the supporting plane is provided with an accurate chamfer forming a supporting curved surface; fitting the semi-finished polarizing product onto a side of the supporting plane, wherein at least a portion of the supporting curved surface has an orthographic projection, positioned at an edge of the semi-finished polarizing product, in a plane where the semi-finished polarizing product is located; and applying a moist and heated gas to the edge of the semi-finished polarizing product to fit it onto a side of the supporting curved surface.

15 Claims, 6 Drawing Sheets

(56) References Cited

U.S. PATENT DOCUMENTS

| | | |
|---|---|---|
| 7,927,522 B2 | 4/2011 | Hsu |
| 7,964,120 B2 | 6/2011 | Hsu |
| 7,964,121 B2 | 6/2011 | Hsu |
| 8,057,716 B2 | 11/2011 | Hsu |
| 8,092,726 B2 | 1/2012 | Hsu |
| 10,195,801 B2 | 2/2019 | Kim |
| 2009/0152747 A1 | 6/2009 | Hsu |
| 2009/0174093 A1 | 7/2009 | Hsu |
| 2009/0174094 A1 | 7/2009 | Hsu |
| 2009/0174095 A1 | 7/2009 | Hsu |
| 2009/0174096 A1 | 7/2009 | Hsu |
| 2009/0278268 A1 | 11/2009 | Hsu |
| 2010/0012262 A1 | 1/2010 | Hsu |
| 2016/0303810 A1 | 10/2016 | Kim |

FOREIGN PATENT DOCUMENTS

| | | | |
|---|---|---|---|
| CN | 101874222 A | | 10/2010 |
| CN | 105873746 A | | 8/2016 |
| CN | 106468795 | * | 3/2017 |
| CN | 107116399 A | | 9/2017 |
| CN | 107369385 A | | 11/2017 |
| CN | 107369385 B | | 9/2019 |
| CN | 110277435 | * | 9/2019 |
| CN | 107116399 B | | 2/2020 |
| EP | 2210142 A1 | | 7/2010 |
| EP | 2210142 B1 | | 2/2014 |
| JP | S62263021 A | | 11/1987 |
| JP | 2012198390 A | | 10/2012 |
| WO | 2009054835 A1 | | 4/2009 |

* cited by examiner

POLARIZER AND MANUFACTURING METHOD THEREOF, DISPLAY PANEL AND MANUFACTURING METHOD THEREOF

CROSS-REFERENCE TO RELATED APPLICATION

The present application is a 35 U.S.C. 371 national phase application of International Application No. PCT/CN2020/105249 filed on Jul. 28, 2020, the entire disclosure of which is incorporated herein by reference.

TECHNICAL FIELD

The present disclosure relates to the field of display technology and, in particular, to a polarizer and a manufacturing method thereof, a display panel, and a manufacturing method thereof.

BACKGROUND

In a curved display panel, such as a quad-curved panel and a dual-curved panel, edges of the display panel are bent at a certain angle toward the back panel so as to give a full three-dimensional display effect in which front display and side display are both provided. However, when forming the above-mentioned display panel with curved surfaces, the polarizer in the display panel is easily damaged by bending. In particular, four corners of the polarizer in a quad-curved display panel are bent spherically, and the spherically bent position is more prone to damage due to bending.

It should be noted that the information disclosed in the background section is intended only to enhance the understanding of the background of the present disclosure and may therefore include information that does not constitute prior art known to those of ordinary skill in the art.

SUMMARY

According to an aspect of the present disclosure, there is provided a method for manufacturing a polarizer. The method comprises:
- providing a flat, semi-finished polarizing product comprising a linear polarizing sheet and a phase difference layer stacked over each other, wherein the linear polarizing sheet comprises an iodine-based polarizing film using polyvinyl alcohol as base material;
- providing an abutment comprising a supporting plane, wherein at least a portion of an edge of the supporting plane is provided with an arcuate chamfer, which arcuate chamfer forms a supporting curved surface;
- fitting the semi-finished polarizing product onto a side of the supporting plane, wherein at least a portion of the supporting curved surface has an orthographic projection in a plane where the semi-finished polarizing product is located, which orthographic projection is positioned at an edge of the semi-finished polarizing product; and
- applying a moist and heated gas to the edge of the semi-finished polarizing product so as to fit the edge of the semi-finished polarizing product onto a side of the supporting curved surface.

In an exemplary embodiment of the present disclosure, the method for manufacturing a polarizer further comprises, while applying the moist and heated gas to the edge of the semi-finished polarizing product, applying a force in a direction facing the abutment on a side of the semi-finished polarizing product away from the abutment.

In an exemplary embodiment of the present disclosure, the method for manufacturing a polarizer further comprises: before fitting the semi-finished polarizing product onto the side of the supporting plane, forming a highly light-transmissive substrate on the abutment, wherein the highly light-transmissive substrate is fitted onto the supporting plane and the supporting curved surface; and the step of applying the semi-finished polarizing product onto the side of the supporting plane comprises: fitting the semi-finished polarizing product onto a side of the highly light-transmissive substrate away from the supporting plane.

In an exemplary embodiment of the present disclosure, the method for manufacturing a polarizer further comprises, after applying the moist and heated gas to the edge of the semi-finished polarizing product, peeling the highly light-transmissive substrate from the semi-finished polarizing product after bending.

In an exemplary embodiment of the present disclosure, the moist and heated gas has a temperature from 35° C. to 85° C.

In an exemplary embodiment of the present disclosure, the moist and heated gas has a humidity from 50% rh to 95% rh.

In an exemplary embodiment of the present disclosure, the moist and heated gas is applied to the edge of the semi-finished polarizing product for a time duration from 1 min to 60 min. In an exemplary embodiment of the present disclosure, the supporting plane is in a shape of rectangle, and all the edge of the supporting plane is provided with a curved chamfer. Further, the semi-finished polarizing product is in a shape of rectangle, and after the semi-finished polarizing product is fitted onto the side of the supporting plane, an orthographic projection of the supporting curved surface in a plane where the semi-finished polarizing product is located is positioned around the semi-finished polarizing product.

In an exemplary embodiment of the present disclosure, the semi-finished polarizing product further comprises: a first bonding layer, a second bonding layer, and a third bonding layer, wherein the first bonding layer is provided on a side of the phase difference layer away from the linear polarizing sheet; the second bonding layer is provided between the phase difference layer and the linear polarizing sheet; and the third bonding layer is provided on a side of the linear polarizing sheet away from the phase difference layer.

In an exemplary embodiment of the present disclosure, the semi-finished polarizing product further comprises a flexible substrate, wherein the flexible substrate is located on a side of the linear polarizing sheet away from the phase difference layer.

In an exemplary embodiment of the present disclosure, the phase difference layer comprises: a quarter-wave plate and a half-wave plate, wherein the quarter-wave plate has a slow axis which forms an angle of $2\alpha+45°$ with relative to an absorption axis of the linear polarizing sheet; the half-wave plate has a slow axis which forms an angle of a with relative to the absorption axis of the linear polarizing sheet, and the half-wave plate has a slow axis which forms an angle of $\alpha+45°$ with relative to the slow axis of the quarter-wave plate, wherein $\alpha$ ranges from 14° to 16°.

According to an aspect of the present disclosure, there is provided a polarizer which is manufactured by the method for manufacturing a polarizer as described above.

According to an aspect of the present disclosure, there is provided a display panel, comprising: a flexible array substrate, a polarizer as described above, and a glass cover plate, wherein the polarizer is fitted onto a side of the flexible array substrate; and the glass cover plate is fitted onto a side of the polarizer away from the flexible array substrate.

In an exemplary embodiment of the present disclosure, an edge of the glass cover plate extends a predetermined length in a direction towards its edge as compared to an edge of the polarizer.

In an exemplary embodiment of the present disclosure, the display panel further comprises an ink layer, wherein the ink layer is coated at edge of a side of the glass cover plate facing the polarizer, a portion of the ink layer is located between the edge of the glass cover plate and the edge of the polarizer, and the portion of the ink layer extends a predetermined length from the edge of the polarizer in a direction away from the edge of the polarizer.

According to an aspect of the present disclosure, there is provided a method for manufacturing a display panel. The method comprising steps of:

forming a polarizer by the method for manufacturing a polarizer as described above;

providing a glass cover plate and a flexible array substrate;

after applying the moist and heated gas to the edge of the semi-finished polarizing product so as to form the polarizer, fitting the glass cover plate onto a side of the polarizer away from the abutment; and fitting a combined structure, which combined structure is formed by fitting the polarizer and the glass cover plate, onto the flexible array substrate, wherein the glass cover plated is located on a side of the polarizer away from the flexible array substrate.

It should be understood that the above general description and the later detailed description are exemplary and explanatory only, and do not limit the present disclosure.

BRIEF DESCRIPTION OF THE DRAWINGS

The accompanying drawings herein are incorporated into and form part of the present specification, illustrate embodiments consistent with the present disclosure, and are used in conjunction with the specification to explain the principle of the present disclosure. It will be apparent that the accompanying drawings in the following description are only some embodiments of the present disclosure, and that other drawings may be obtained from these drawings without creative effort by one of ordinary skill in the art.

DETAILED DESCRIPTION OF THE EMBODIMENTS

Figure 1:
FIG. 1 is a physical view of a quad-curved polarizer formed by extrusion using related techniques.

Example embodiments will now be described more fully with reference to the accompanying drawings. However, the example embodiments can be implemented in a variety of forms and should not be construed as being limited to the examples set forth herein. Rather, the provision of these embodiments makes the present disclosure more comprehensive and complete, and conveys the ideas of the example embodiments to those skilled in the art in a comprehensive manner. The same reference numerals in the figures indicate the same or similar structures, and thus their detailed description will be omitted.

Although relative terms such as "up" and "down" are used in the present specification to describe the relative relationship between one component represented by the icon and another, these terms are used in the present specification only for convenience, for example, based on the example orientation as described in the accompanying drawings. It is understood that if the device represented by the icon is flipped so that it is upside down, the component described as being "up" will become the component described as being "down". Other relative terms, such as "high," "low," "top," "bottom," "left", "right", etc. have similar meanings. When a structure is "on" other structures, it may mean that the structure is formed on the other structures, or that the structure is "directly" arranged on the other structures, or that the structure is "indirectly" arranged on the other structures via a different structure.

The terms "a", "one", and "said" are used to indicate the existence of one or more elements/composition distinctions/etc. The terms "includes" and "having" are used to indicate the open-ended inclusion, meaning that additional elements/component distinctions/etc. may exist in addition to the listed elements/component distinctions/etc.

In an OLED display panel, a circular polarizer is usually required on a side of the array substrate facing the light exit side, where the circular polarizer is used to reduce the reflection of ambient light by the OLED display panel. In a curved display panel, such as a quad-curved panel and a dual-curved panel, edges of the display panel are bent towards the back panel at a certain angle, so as to present a full three-dimensional display effect having both front display and side display. Accordingly, edges of the circular polarizer also need to be bent at an angle towards the back panel. In related technologies, when a curved display panel is assembled, a flat circular polarizer is first provided covering the curved array substrate and, then, a glass cover plate having a curved structure is used to cover a side of the circular polarizer away from the curved array substrate. The curved glass cover plate is configured to squeeze the flat circular polarizer so that the circular polarizer forms a correspondingly curved structure.

However, the circular polarizer is easily damaged due to bending when it is squeezed. In particular, in a quad-curved display panel, four corners of the circular polarizer need to be squeezed into spherically bending structures, and the surface area of each spherically bending structure is smaller than the surface area of the respective corner when the circular polarizer is in a planar structure. Therefore, the four corners of the circular polarizer are highly susceptible to wrinkles and fractures after the circular polarizer is squeezed. As shown in FIG. 1, a physical view of a quad-curved circular polarizer formed by squeezing using related technologies is shown. FIG. 1 shows the physical view of the four corners of the quad-curved circular polarizer, and it can be seen from FIG. 1 that the spherical surface at the four corners of the quad-curved circular polarizer formed using the related technologies is fractured.

Figure 2:
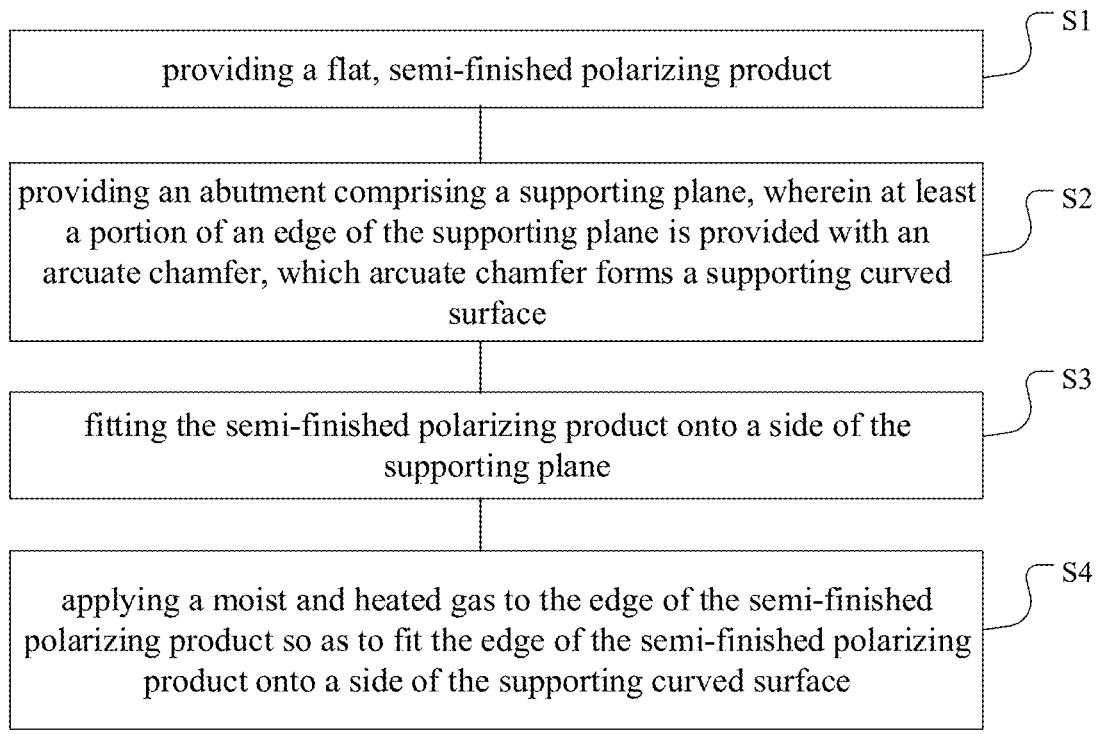
FIG. 2 is a schematic structural diagram of the method for manufacturing a polarizer according to an exemplary embodiment of the present disclosure.

In view of the foregoing, an exemplary embodiment of the present disclosure provides a method for manufacturing a polarizer, as shown in FIG. 2 which is a schematic structural view of the method for manufacturing a polarizer according to an exemplary embodiment of the present disclosure. The method comprises the following steps.

Step S1: providing a flat, semi-finished polarizing product comprising a linear polarizing sheet and a phase difference layer stacked over each other, wherein the linear polarizing sheet comprises an iodine-based polarizing film using polyvinyl alcohol as base material.

Step S2: providing an abutment comprising a supporting plane, wherein at least a portion of an edge of the supporting plane is provided with an arcuate chamfer, which arcuate chamfer forms a supporting curved surface.

Step S3: fitting the semi-finished polarizing product onto a side of the supporting plane, wherein at least a portion of the supporting curved surface has an orthographic projection in a plane where the semi-finished polarizing product is located, which orthographic projection is positioned at an edge of the semi-finished polarizing product.

Step S4: applying a moist and heated gas to the edge of the semi-finished polarizing product so as to fit the edge of the semi-finished polarizing product onto a side of the supporting curved surface.

Figure 3:
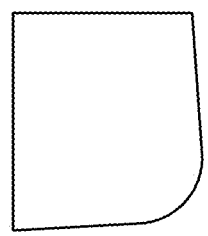
FIG. 3 is a physical view of a quad-curved polarizer formed using the method for manufacturing a polarizer according to the present disclosure.

In an exemplary embodiment, the linear polarizing sheet comprises an iodine-based polarizing film using polyvinyl alcohol as a base material. The linear polarizing sheet can contain polyvinyl alcohol (PVA) and iodine chains having dichroism. The fabrication process of the linear polarizing sheet can include: first, washing the PVA film to expand, then soaking the PVA film in iodine solution, and finally, stretching the PVA film by a certain number of times in size to form the linear polarizing sheet. In this case, the PVA film can be stretched by 4-7 times in size. Therefore, the linear polarizing sheet has a certain reversion pre-stress. Especially, under high temperature and high humidity, the reversion pre-stress of the linear polarizing sheet will be enhanced accordingly, so that shrinkage will occur more easily. In an exemplary embodiment, the semi-finished polarizing product with a flat structure is placed on the supporting surface of the abutment. Considering the increased reversion pre-stress of the linear polarizing sheet under high temperature and high humidity, a gas having high temperature and high humidity is applied to a portion of the semi-finished polarizing product that needs to be bent. The portion of the linear polarizing sheet to which the gas having high temperature and high humidity is applied drives the phase difference layer to bend simultaneously under the reversion pre-stress, so as to fit the polarizer onto a side of the supporting curved surface. The method allows the portion of the polarizer to which the gas having high temperature and high humidity is applied to form the same curved structure as the supporting curved surface, thereby forming the flat semi-finished polarizing product into a finished polarizer with curved edges. In the method for manufacturing a polarizer, the phase difference layer is bent at the same time by the reversion pre-stress of the linear polarizing sheet, and the linear polarizing sheet is not damaged due to its own reversion pre-stress. In addition, the phase difference layer is not easily damaged, because the phase difference layer has a certain degree of flexibility, and the reversion pre-stress of the linear polarizing sheet exerts a uniform force on the phase difference layer. The method for manufacturing a polarizer as provided in the above exemplary embodiment can form a curved polarizer such as a quad-curved polarizer, a dual-curved polarizer, etc. As in FIG. 3, a physical view is shown of a quad-curved polarizer formed by the method for manufacturing a polarizer according to the present disclosure. FIG. 3 shows a physical view of four corners of the quad-curved polarizer, and it can be seen from FIG. 3 that the four corners of the quad-curved polarizer formed by the method for manufacturing a polarizer provided in the present exemplary embodiment are spherically complete. In addition, after testing, a good polarizing effect is provided using the polarizer formed by the method for manufacturing a polarizer provided in the present exemplary embodiment.

The following is a detailed description of the above steps.

Figure 4:
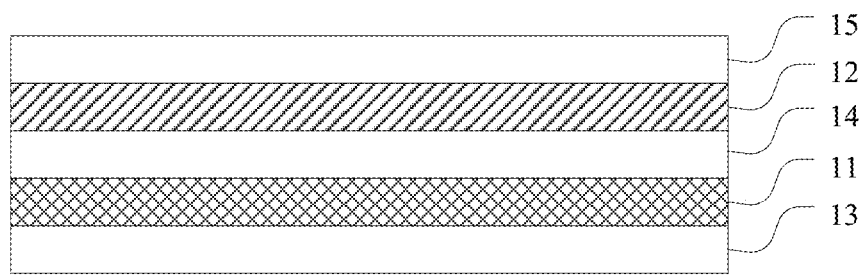
FIG. 4 is a schematic structural diagram of a semi-finished polarizing product in the method for manufacturing a polarizer according to an exemplary embodiment of the present disclosure.

In step S1, a schematic structural diagram of a semi-finished polarizing product in the method for manufacturing a polarizer according to an exemplary embodiment of the present disclosure is shown in FIG. 4. The semi-finished polarizing product can be a circular polarizing product with a planar structure. Specifically, the semi-finished polarizing product can include a linear polarizing sheet 12 and a phase difference layer 11 stacked over each other, wherein the linear polarizing sheet 12 can be an iodine-based polarizing film using polyvinyl alcohol as base material. The thickness of the linear polarizing sheet may be from 1 to 15 um, for example, 1 um, 8 um, 15 um, and may preferably be from 5 um to 12 um.

As shown in FIG. 4, the semi-finished polarizing product may also include: a first bonding layer 13, a second bonding layer 14, and a third bonding layer 15, wherein the first bonding layer 13 is provided on a side of the phase difference layer 11 away from the linear polarizing sheet 12; the second bonding layer 14 is provided between the phase difference layer 11 and the linear polarizing sheet 12; and the third bonding layer 15 is provided on a side of the linear polarizing sheet 12 away from the phase difference layer 11. The first bonding layer, the second bonding layer and the third bonding layer can be pressure-sensitive adhesive layers.

Figure 5:
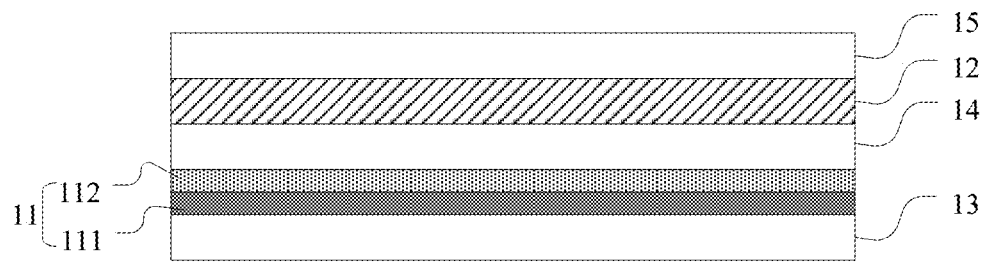
FIG. 5 is a schematic structural diagram of a semi-finished polarizing product in the method for manufacturing a polarizer according to another exemplary embodiment of the present disclosure.

As in FIG. 5, a schematic structural diagram is shown of a semi-finished polarizing product in the method for manufacturing a polarizer according to another exemplary embodiment of the present disclosure. The phase difference layer may include: a quarter-wave plate 111 and a half-wave plate 112, wherein the slow axis of the quarter-wave plate 111 may form an angle of $2\alpha+45°$ with relative to the absorption axis of the linear polarizing sheet 12; the slow axis of the half-wave plate 112 may form an angle of a with relative to the absorption axis of the linear polarizing sheet, and the slow axis of the half-wave plate may form an angle of $\alpha+45°$ with relative to the slow axis of the quarter-wave plate, wherein $\alpha$ may be 14°-16°. For example, a may be 14°, 15°, or 16°. The quarter-wave plate 111 can be located on a side of the half-wave plate 112 away from the linear polarizing sheet 12. The quarter-wave plate 111 and the half-wave plate 112 may include liquid crystal material. The total thickness of the phase difference layer may be between 1-7 um, such as 1 um, 3 um, or 7 um.

Figure 6:
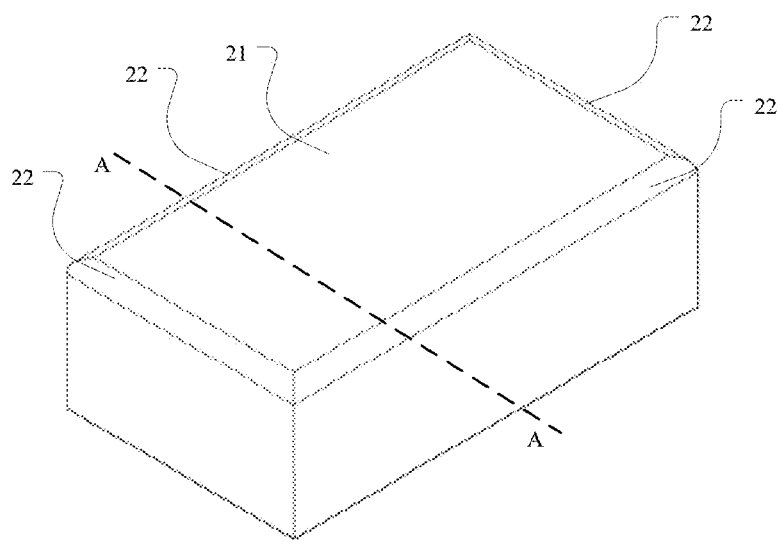
FIG. 6 is a schematic structural diagram of an abutment in the method for manufacturing a polarizer according to an exemplary embodiment of the present disclosure.
Figure 7:
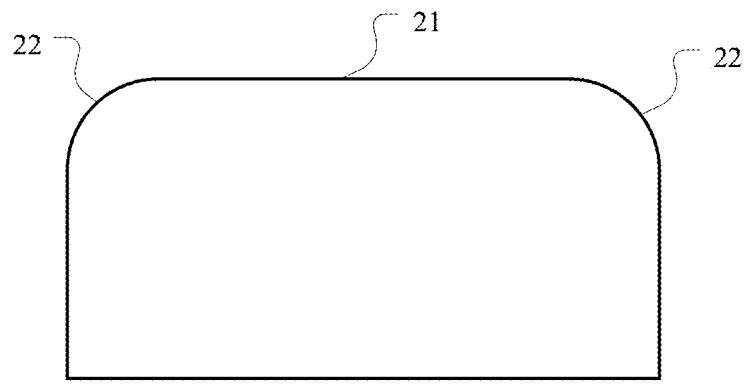
FIG. 7 is a cross-sectional view taken along line A-A in FIG. 6.

In step S2, as shown in FIGS. 6 and 7, FIG. 6 is a schematic structural diagram of an abutment in the method for manufacturing a polarizer according to one exemplary embodiment of the present disclosure, and FIG. 7 is a cross-sectional view taken along line A-A in FIG. 6. Step S2 comprises providing an abutment comprising a supporting plane 21, wherein the supporting plane is provided with a curved chamfer at edge, and the curved chamfer forms a supporting curved surface 22. As shown in FIGS. 6 and 7, in an exemplary embodiment, the supporting plane 21 may be in a shape of rectangular, the supporting plane 21 is provided with a curved chamfer at edge, and the supporting plane 21 is spherically bent at a junction between two adjacent edges thereof.

Figure 8:
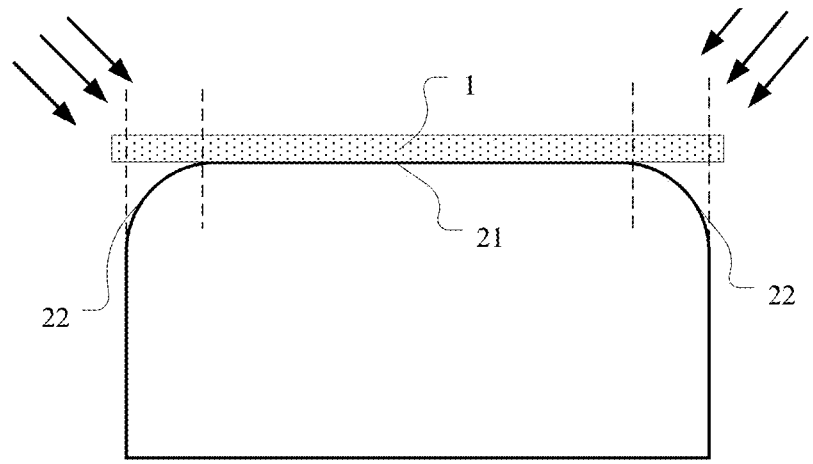
FIG. 8 is a schematic structural diagram of a semi-finished polarizing product fitted onto an abutment in the method for manufacturing a polarizer according to an exemplary embodiment of the present disclosure.

In step S3, a structural schematic diagram of a semi-finished polarizing product fitted onto an abutment in the method for manufacturing a polarizer according to an exemplary embodiment of the present disclosure is shown in FIG. 8. Step S3 includes fitting the semi-finished polarizing product 1 onto a side of the supporting plane 21, wherein the semi-finished polarizing product 1 may be in a shape of rectangular, and after the semi-finished polarizing product 1 is fitted onto the side of the supporting plane, the orthographic projection of the supporting curved surface 22 in a plane where the semi-finished polarizing product 1 is located may be positioned around the semi-finished polarizing product 1.

Figure 9:
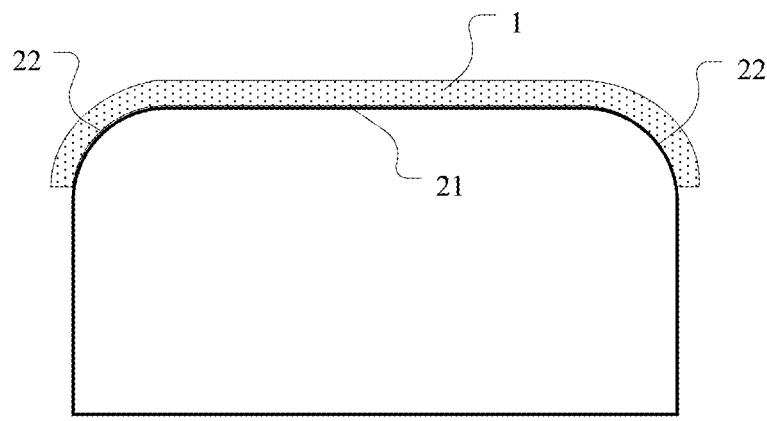
FIG. 9 is a schematic structural diagram of a semi-finished polarizing product fitted onto an abutment after the application of a moist and heated gas in the method for manufacturing a polarizer according to an exemplary embodiment of the present disclosure.

In step S4, a moist and heated gas is applied to the edge of the semi-finished polarizing product 1. As shown in FIG. 8, the direction of the arrow may indicate the direction in which the moist and heated gas is applied. As in FIG. 9, a schematic structural diagram is shown of the semi-finished polarizing product fitted onto the abutment after the application of the moist and heated gas in the method for manufacturing a polarizer according to an exemplary embodiment of the present disclosure. As shown in FIG. 9, the edge of the semi-finished polarizing product 1 shrinks under the moist and heated gas so as to fit onto a side of the supporting curved surface 22. Thus, the semi-finished polarizing product 1 can form a quad-curved structure.

In addition, as shown in FIGS. 4 and 5, none of the semi-finished polarizing products provided in the above exemplary embodiment includes a substrate to provide stiffness for the polarizer. The semi-finished polarizing products can be bent relatively easily under the reversion pre-stress of the linear polarizing sheet. It should be understood that in other exemplary embodiments, the semi-finished polarizing product may also include a flexible substrate that may improve the stiffness of the semi-finished polarizing product to a certain extent. For example, as in FIG. 10, a schematic structural diagram is shown of the semi-finished polarizing product in the method for manufacturing a polarizer according to another exemplary embodiment of the present disclosure. The semi-finished polarizing product can include a linear polarizing sheet 12 and a phase difference layer 11 stacked over each other, a first bonding layer 13, a second bonding layer 14, and a flexible substrate 16. The linear polarizing sheet 12 can be an iodine-based polarizing film using polyvinyl alcohol as base material. The first bonding layer 13 can be provided on a side of the phase difference layer 11 away from the linear polarizing sheet 12. The second bonding layer 14 can be provided between the phase difference layer 11 and the linear polarizing sheet 12. The flexible substrate 16 can be provided on a side of the linear polarizing sheet 12 away from the phase difference layer 11. The flexible substrate 16 and the linear polarizing sheet 12 can be bonded by a press-fit process. In addition, the flexible substrate 16 and the linear polarizing sheet 12 can also be bonded by a bonding layer. Material of the flexible substrate 16 may include one or more of polymethyl methacrylate, thermoplastic polyurethane, polyimide, polyethylene terephthalate, and cyclic olefin polymer.

Figure 11:
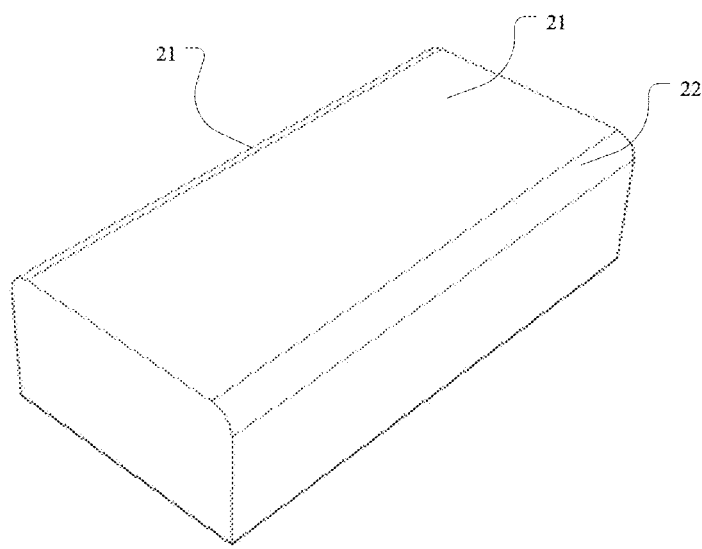
FIG. 11 is a schematic structural diagram of an abutment in the method for manufacturing a polarizer according to another exemplary embodiment of the present disclosure.

It should be understood that in other exemplary embodiments, the abutment may also be other shapes so that polarizers of other structures can be formed by the above method. For example, the supporting plane may be circular, trapezoidal, or in other shapes. Accordingly, the above semi-finished polarizing products may be shaped in a similar way, so that polarizers having different shapes of body and curved edges can be formed using the above method for manufacturing a polarizer. In addition, the supporting plane can be provided with curved chamfers at only part of its edges. For example, as in FIG. 11, a schematic structural diagram is shown of an abutment in the method for manufacturing a polarizer according to another exemplary embodiment of the present disclosure. The abutment includes a rectangular supporting plane 21, wherein the supporting plane 21 is provided with curved chamfers at two opposite edges, and the abutment can be used in combination with the method for manufacturing a polarizer as described above so as to form a polarizer with a dual-curved structure.

In an exemplary embodiment, the application of the moist and heated gas to the edge of the semi-finished polarizing product may be accompanied by the application of a force in a direction facing the abutment on a side of the semi-finished polarizing product away from the abutment. The force applied to the semi-finished polarizing product may cause the semi-finished polarizing product to press against the supporting plane of the abutment under the moist and heated gas. In this way, no gap is created between the supporting plane and the semi-finished polarizing product due to shrinkage, thereby avoiding the formation of a non-planar structure on the front side of the polarizer. Specifically, in an exemplary embodiment, a non-bendable sheet may be used to fit onto a side of the semi-finished polarizing product away from the abutment, and a force can be applied in a direction facing the abutment on the semi-finished polarizing product by pressing the non-bendable sheet.

In an exemplary embodiment, the temperature of the moist and heated gas may be from 35° C. to 85° C. For example, the temperature of the moist and heated gas may be 35° C., 60° C., or 85° C. The humidity of the moist and heated gas can be from 50% rh to 95% rh. For example, the humidity of the moist and heated gas can be 50% rh, 75% rh, or 95% rh. The time duration for applying the moist and heated gas to the edge of the semi-finished polarizing product can be from 1 min to 60 min. For example, the time duration can be 1 min, 30 min, or 60 min. In an exemplary embodiment, the higher the temperature of the moist and heated gas is, the greater the reversion pre-stress will be at the portion to which the moist and heated gas is applied, the faster the bending speed of the semi-finished polarizing product will be, and the more obvious the bending effect will be. Further, the higher the humidity of the moist and heated gas is, the greater the reversion pre-stress will be at the portion to which the moist and heated gas is applied, the faster the bending speed of the semi-finished polarizing product will be, and the more obvious the bending effect will be. Besides, the longer the time duration for applying the moist and heated gas is, the more obvious the bending effect of the semi-finished polarizing product will be.

Figure 12:
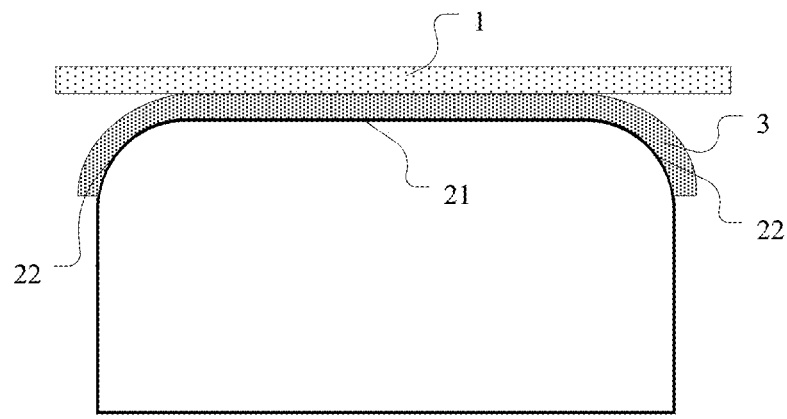
FIG. 12 is a schematic structural diagram of a semi-finished polarizing product fitted onto an abutment in the method for manufacturing a polarizer according to another exemplary embodiment of the present disclosure.

In an exemplary embodiment, as shown in FIG. 4, both sides of the semi-finished polarizing product need to be provided with a bonding layer, wherein the bonding layer is used to bond other film layers in the display panel. If the semi-finished polarizing product is directly attached to the abutment, the semi-finished polarizing product will be easily bonded onto the abutment, and thus the semi-finished polarizing product will not be easily removed from the abutment. In an exemplary embodiment, as in FIG. 12, a schematic structural diagram is shown of the semi-finished polarizing product fitted onto the abutment in the method for manufacturing a polarizer according to another exemplary embodiment of the present disclosure. Before fitting the semi-finished polarizing product 1 onto a side of the supporting plane 21, a highly light-transmissive substrate 3 may be formed on the abutment, wherein the highly light-transmissive substrate 3 may be fitted onto the supporting plane and the supporting curved surface. The step of fitting the semi-finished polarizing product 1 onto the side of the supporting plane 21 may comprise fitting the semi-finished polarizing product 1 onto a side of the highly light-transmissive substrate 3 away from the supporting plane 21. Specifically, the material of the highly light-transmissive substrate 3 may include one or more of ultra-thin glass, thermoplastic polyurethane, polyimide, and PET. The highly light-transmissive substrate 3 can be fitted onto the supporting plane and the supporting curved surface of the abutment by a thermal bending process, wherein the part of the highly light-transmissive substrate 3 fitted onto the supporting curved surface forms the same curved structure as the supporting curved surface. As in FIG. 13, a schematic structural diagram is shown of the semi-finished polarizing product fitted onto the abutment in the method for manufacturing a polarizer according to another exemplary embodiment of the present disclosure. Based on what is shown in FIG. 12, the moist and heated gas is applied to an edge of the semi-finished polarizing product so as to fit the edge of the semi-finished polarizing product 1 onto the curved edge of the highly light-transmissive substrate 3, thereby forming the same curved structure as the supporting curved surface. The combined structure formed by bonding the highly light-transmissive substrate 3 and the semi-finished polarizing product 1 can be easily removed from the abutment. The combined structure formed by bonding the highly light-transmissive substrate 3 and the semi-finished polarizing product 1 can be directly applied into the display panel as a polarizer. It should be understood that in other exemplary embodiments, after the combined structure formed by bonding the highly light-transmissive substrate 3 and the semi-finished polarizing product 1 is removed from the abutment, the highly light-transmissive substrate 3 can also be peeled off from the bent semi-finished polarizing product 1. In this way, only the bent semi-finished polarizing product 1 can be applied into the display panel as a polarizer. For example, the highly light-transmissive substrate 3 and thus the bent semi-finished polarizing product 1 can be peeled off using laser peeling.

Figure 10:
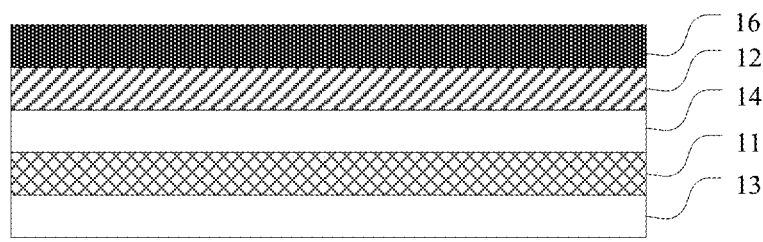
FIG. 10 is a schematic structural diagram of a semi-finished polarizing product in the method for manufacturing a polarizer according to another exemplary embodiment of the present disclosure.
Figure 13:
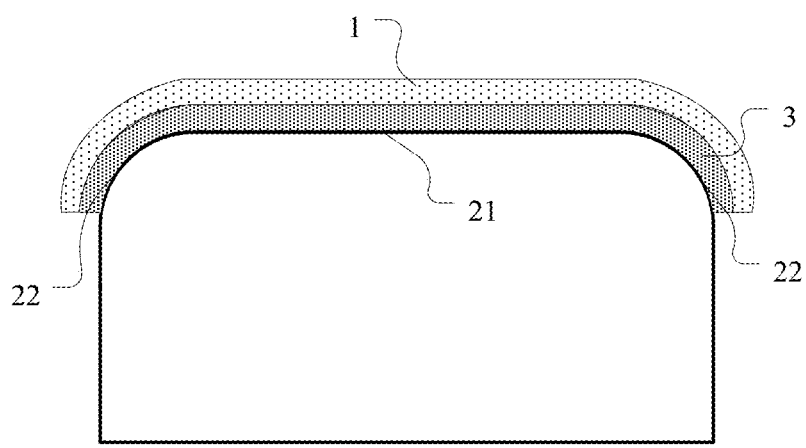
FIG. 13 is a schematic structural diagram of a semi-finished polarizing product fitted onto an abutment in the method for manufacturing a polarizer according to another exemplary embodiment of the present disclosure.
Figure 14:
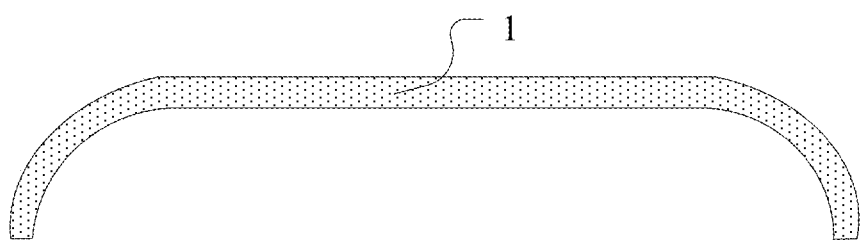
FIG. 14 is a schematic structural diagram of the polarizer according to an exemplary embodiment of the present disclosure.
Figure 15:
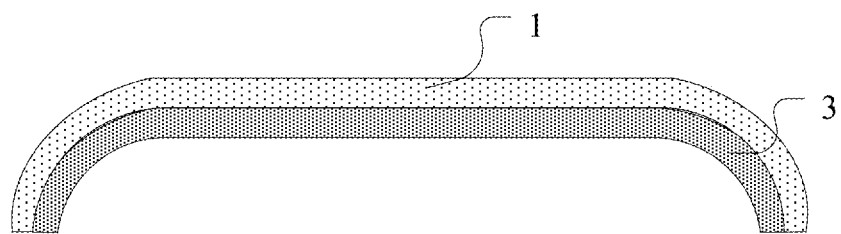
FIG. 15 is a schematic structural diagram of the polarizer according to another exemplary embodiment of the present disclosure.

An exemplary embodiment of the present disclosure also provides a polarizer that can be made by the method for manufacturing a polarizer as described above. As shown in FIGS. 14 and 15, FIG. 14 is a schematic structural diagram of the polarizer according to an exemplary embodiment of the present disclosure, and FIG. 15 is a schematic structural diagram of the polarizer according to another exemplary embodiment of the present disclosure. The polarizer shown in FIG. 14 can be made by the method for manufacturing a polarizer as shown in FIGS. 9 and 10 above, which polarizer is formed from the above semi-finished polarizing product 1 after the edge thereof is bent. The polarizer shown in FIG. 15 can be made by the method for manufacturing a polarizer as shown in FIGS. 12 and 13 above, and the polarizer can be formed by combining the semi-finished polarizing product 1 after edge bending and the highly light-transmissive substrate 3 having the same bending structure. In addition, the polarizer shown in FIG. 14 can also be formed by peeling the highly light-transmissive substrate 3 from the polarizer shown in FIG. 15.

Figure 16:
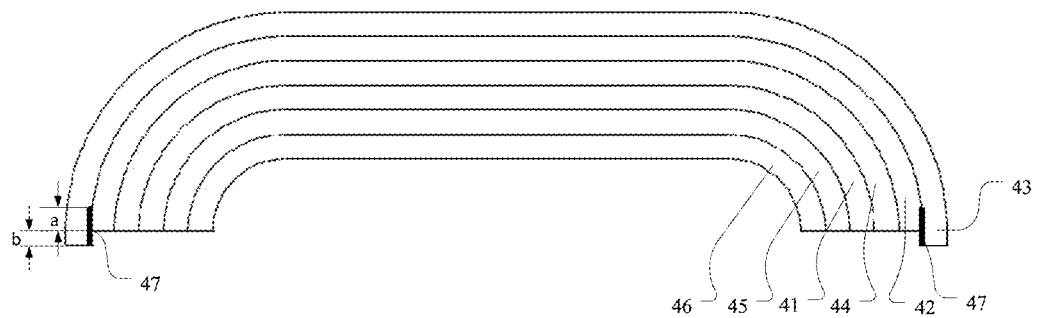
FIG. 16 is a schematic structural diagram of the display panel according to an exemplary embodiment of the present disclosure.

An exemplary embodiment of the present disclosure also provides a display panel. As in FIG. 16, a schematic structural structure is shown of the display panel according to an exemplary embodiment of the present disclosure. The display panel may include: a flexible array substrate 41, any of the above polarizers 42, and a glass cover plate 43, wherein the polarizer 42 is fitted onto a side of the flexible array substrate 41; and the glass cover plate 43 is fitted onto a side of the polarizer 42 away from the flexible array substrate 41. As shown in FIG. 16, the flexible array substrate 41, the polarizer 42, and the glass cover plate 43 may have the same curved structure. For example, when the polarizer 42, the flexible array substrate 41, and the glass cover plate 43 are of the same quad-curved structure, the display panel may correspondingly be of a quad-curved structure. When the polarizer 42, the flexible array substrate 41, and the glass cover plate 43 are of the same hyper-curved structure, the display panel can correspondingly be of a hyper-curved structure.

As shown in FIG. 16, the display panel may further include a bonding layer 44 disposed between the polarizer 42 and the flexible array substrate 41, a supporting layer 46 disposed on a side of the flexible array substrate 41 away from the polarizer 42, and a bonding layer 45 disposed between the supporting layer 46 and the flexible array substrate 41. In this case, the flexible array substrate 41, the polarizer 42, the glass cover plate 43, the bonding layer 44, the bonding layer 45, and the supporting layer 46 may have the same edge-bending structure, so as to achieve mutual fitting therebetween.

As shown in FIG. 16, the edge of the glass cover plate 43 can be extended to a certain length b in a direction towards its edge as compared to the edge of the polarizer 42, wherein the length b can be set to compensate for the error in assembly of the display panel, so as to avoid leakage of the polarizer 42.

As shown in FIG. 16, the display panel also includes an ink layer 47, which is coated at edge of a side of the glass cover plate 43 facing the polarizer 42. The ink layer 47 exhibits a shading effect, and the ink layer 47 can enclose a regular image, so that the display panel forms a regular display area. As shown in FIG. 16, part of the ink layer 47 is located between the edge of the polarizer 42 and the edge of the glass cover plate 43, and such part of the ink layer extends a certain length a from the edge of the polarizer 42 towards a side away from the edge of the polarizer 42. Since the polarizer 42 will shrink after long-term use, the extending length a as mentioned above of the ink layer can prevent the display panel from light leakage after long-term use. For example, a can be greater than 0.5 mm. The thickness of the ink layer 47 can be from 3 to 10 um. For example, the thickness of the ink layer 47 can be 3 um, 5 um, or 10 um. The total width a+b of the ink layer 47 can be from 2 to 6 mm. For example, the total width a+b of the ink layer 47 can be 2 mm, 4 mm, or 6 mm. The side of the glass cover plate 43 away from the polarizer 42 can also be coated with an anti-fingerprint coating. The glass cover plate 43 can be formed by thermal bending of a flat glass plate.

An exemplary embodiment of the present disclosure also provides a method for manufacturing a display panel. The method comprising:

forming a polarizer by the method for manufacturing a polarizer as described above;

providing a glass cover plate and a flexible array substrate;

after applying the moist and heated gas to the edge of the semi-finished polarizing product so as to form the polarizer, fitting the glass cover plate onto a side of the polarizer away from the abutment; and fitting a combined structure, which combined structure is formed by fitting the polarizer and the glass cover plate, onto the flexible array substrate, wherein the glass cover plate is located on a side of the polarizer away from the flexible array substrate.

On one hand, the method for manufacturing a display panel allows fitting the glass cover plate onto the polarizer when the polarizer is located on the abutment, thus avoiding transfer of the polarizer, and reducing the risk of damage to the polarizer. On the other hand, the method for manufacturing a display panel allows fitting the glass cover plate onto the polarizer, thus increasing the stiffness of the polarizer, and facilitating transfer of the polarizer and any subsequent process, such as fitting. Among them, the flexible array substrate, the polarizer, and the glass cover plate can have the same bending structure.

Other embodiments of the present disclosure will readily come to the mind of those skilled in the art upon consideration of the present specification and practice of the present disclosure described herein. The present application is intended to cover any variation, use, or adaptive variation of the present disclosure that follows the generality of the present disclosure, and the present application includes those commonly known or customary technical means in the art that are not disclosed herein. The present specification and embodiments are considered exemplary only, and the true scope and spirit of the present disclosure is indicated by the claims.

It is to be understood that the present disclosure is not limited to the precise construction as already described above and illustrated in the accompanying drawings, and that various modifications and changes may be made without departing from the scope of the present disclosure. The scope of the present disclosure is limited only by the appended claims.

The invention claimed is:

1. A method for manufacturing a polarizer, comprising:
   providing a flat polarizing product comprising a linear polarizing sheet and a phase difference layer stacked over each other, wherein the linear polarizing sheet comprises an iodine-based polarizing film using polyvinyl alcohol as base material;
   providing an abutment comprising a supporting plane, wherein at least a portion of an edge of the supporting plane is provided with an arcuate chamfer, which arcuate chamfer forms a supporting curved surface;
   fitting the polarizing product onto a side of the supporting plane, so that an orthographic projection of a second edge of the supporting curved surface in a plane where the supporting plane is located goes beyond an edge of the polarizing product, wherein the supporting curved surface comprises a first edge connected with a central portion of the supporting plane and the second edge opposite to the first edge; and
   applying a moist and heated gas to the edge of the polarizing product so as to fit the edge of the polarizing product onto a side of the supporting curved surface.

2. The method for manufacturing a polarizer according to claim 1, further comprising: while applying the moist and heated gas to the edge of the polarizing product, applying a force, in a direction facing the abutment, on a side of the polarizing product away from the abutment.

3. The method for manufacturing a polarizer according to claim 1, further comprising:
   before fitting the polarizing product onto the side of the supporting plane, forming a highly light-transmissive substrate on the abutment, wherein the highly light-transmissive substrate is fitted onto the supporting plane and the supporting curved surface; and
   fitting the polarizing product onto the side of the supporting plane comprises: fitting the polarizing product onto a side of the highly light-transmissive substrate away from the supporting plane.

4. The method for manufacturing a polarizer according to claim 3, further comprising: after applying the moist and heated gas to the edge of the polarizing product, peeling the highly light-transmissive substrate from the polarizing product after bending.

5. The method for manufacturing a polarizer according to claim 1, wherein the moist and heated gas has a temperature from 35° C. to 85° C.

6. The method for manufacturing a polarizer according to claim 1, wherein the moist and heated gas has a humidity from 50% rh to 95% rh.

7. The method for manufacturing a polarizer according to claim 1, wherein the moist and heated gas is applied to the edge of the polarizing product for a time duration from 1 min to 60 min.

8. The method for manufacturing a polarizer according to claim 1, wherein
   the supporting plane is in a shape of rectangular and all the edge of the supporting plane is provided with an arcuate chamfer; and
   the polarizing product is in a shape of rectangular, and after the polarizing product is fitted onto the side of the supporting plane, an orthographic projection of the supporting curved surface in a plane where the polarizing product is located is positioned around the polarizing product.

9. The method for manufacturing a polarizer according to claim 1, wherein the polarizing product further comprises:
a first bonding layer located on a side of the phase difference layer away from the linear polarizing sheet;
a second bonding layer located between the phase difference layer and the linear polarizing sheet; and
a third bonding layer located on a side of the linear polarizing sheet away from the phase difference layer.

10. The method for manufacturing a polarizer according to claim 1, wherein the polarizing product further comprises: a flexible substrate located on a side of the linear polarizing sheet away from the phase difference layer.

11. The method for manufacturing a polarizer according to claim 1, wherein the phase difference layer comprises:
a quarter-wave plate having a slow axis which forms an angle of $2\alpha+45°$ with relative to an absorption axis of the linear polarizing sheet; and
a half-wave plate having a slow axis which forms an angle of $\alpha$ with relative to the absorption axis of the linear polarizing sheet and an angle of $\alpha+45°$ with relative to the slow axis of the quarter-wave plate,
wherein $\alpha$ ranges from 14° to 16°.

12. A method for manufacturing a display panel, comprising:
forming a polarizer by;
providing a flat polarizing product comprising a linear polarizing sheet and a phase difference layer stacked over each other, wherein the linear polarizing sheet comprises an iodine-based polarizing film using polyvinyl alcohol as base material;
providing an abutment comprising a supporting plane, wherein at least a portion of an edge of the supporting plane is provided with an arcuate chamfer, which arcuate chamfer forms a supporting curved surface;
fitting the polarizing product onto a side of the supporting plane, so that an orthographic projection of a second edge of the supporting curved surface in a plane where the supporting plane is located goes beyond an edge of the polarizing product, wherein the supporting curved surface comprises a first edge connected with a central portion of the supporting plane and the second edge opposite to the first edge; and
applying a moist and heated gas to the edge of the polarizing product so as to fit the edge of the polarizing product onto a side of the supporting curved surface;
after applying the moist and heated gas to the edge of the polarizing product so as to form the polarizer, fitting the glass cover plate onto a side of the polarizer away from the abutment; and
fitting a combined structure, which combined structure is formed by fitting the polarizer and the glass cover plate, onto the flexible array substrate, wherein the glass cover plate is located on a side of the polarizer away from the flexible array substrate.

13. The method for manufacturing a display panel according to claim 12, wherein the method for manufacturing a polarizer further comprises, while applying the moist and heated gas to the edge of the polarizing product, applying a force, in a direction facing the abutment, on a side of the polarizing product away from the abutment.

14. The method for manufacturing a display panel according to claim 12, wherein the method for manufacturing a polarizer further comprises:
before fitting the polarizing product onto the side of the supporting plane, forming a highly light-transmissive substrate on the abutment, wherein the highly light-transmissive substrate is fitted onto the supporting plane and the supporting curved surface; and
fitting the polarizing product onto the side of the supporting plane comprises: fitting the polarizing product onto a side of the highly light-transmissive substrate away from the supporting plane.

15. The method for manufacturing a display panel according to claim 14, wherein the method for manufacturing a polarizer further comprises, after applying the moist and heated gas to the edge of the polarizing product, peeling the highly light-transmissive substrate from the polarizing product after bending.

* * * * *